United States Patent [19]

Otani et al.

[11] 4,424,839

[45] Jan. 10, 1984

[54] INLET FOR A FUEL TANK

[75] Inventors: Junji Otani, Omiya; Noriyasu Matsuhashi, Sakado, both of Japan

[73] Assignee: Honda Giken Kogyo Kabushiki Kaisha, Tokyo, Japan

[21] Appl. No.: 478,834

[22] Filed: Mar. 18, 1983

Related U.S. Application Data

[63] Continuation of Ser. No. 228,929, Jan. 21, 1981, abandoned.

[30] Foreign Application Priority Data

Jan. 22, 1980 [JP] Japan ................................. 55-5455
Jan. 25, 1980 [JP] Japan ................................. 55-7062

[51] Int. Cl.³ ................................................ B67C 3/30
[52] U.S. Cl. .................................... 141/348; 141/326; 220/86 R; 251/149.2

[58] Field of Search ........................ 141/286, 331–345, 141/311 R, 346–362, 392, 325–327; 220/35, 36, 220/86 R, 86 AT; 251/149.2, 339; 137/351, 588 137/592; 280/5 A; 296/1 C

[56] References Cited

U.S. PATENT DOCUMENTS 3,911,977 10/1975 Berger .
4,248,279 9/1981 Warmbold .

Primary Examiner—Houston S. Bell, Jr.
Attorney, Agent, or Firm—Armstrong, Nikaido, Marmelstein & Kubovcik

[57] ABSTRACT

A tubular inlet for a fuel tank includes a transverse baffle having an opening sized to receive a fuel nozzle of a determined diameter, and apertures located laterally of said opening and which permit viewing of the tank interior when a nozzle is inserted into the said opening, the structure optionally including a movable shutter which is resilient biased to a position in which it closes said opening, the shutter being movable by said nozzle against said bias.

4 Claims, 10 Drawing Figures

INLET FOR A FUEL TANK

This is a continuation of application Ser. No. 228,929, filed Jan. 21, 1981, now abandoned.

FIELD OF THE INVENTION

This invention relates to a fuel inlet for a fuel tank, and, while not limited thereto, particularly relates to a fuel inlet for the fuel tank of a motorcycle or similar vehicle.

BACKGROUND OF THE INVENTION

A commonly known form of fuel tank for a motorcycle includes a closed tank which is disposed above a frame of the motorcycle and which has a fuel inlet in an upwardly presented surface thereof, the fuel inlet being of tubular form and having cam surfaces at the upper end thereof for interlocking engagement with a removable closure cap.

Owing to the somewhat shallow depth of such a fuel tank as compared with the length of the fuel inlet of an automobile, a fuel nozzle of the automatic cut-off type cannot be used in its intended manner, and, as a consequence, manually controlled filling of the fuel tank is necessitated, with the necessity of observing the level of the fuel as it rises in the tank in order to avoid over filling of the tank and spillage of the fuel.

While this does not pose a particular problem in those instances where the engine is designed to operate on a fuel such as conventional leaded gasoline, in which event the inlet can be made conveniently large enough to permit viewing of the interior of the tank at the time the fuel nozzle is disposed within the inlet, it poses acute problems in those instances where the engine is designed to operate on a fuel such as unleaded gasoline, in which event the inlet must be dimensioned for it to accept only the fuel nozzle employed for dispensing unleaded gasoline, and, for it to be too small in diameter for it to accept the larger diameter nozzle employed for dispensing leaded gasoline.

As a consequence of the requirement for the inlet to reject the said larger diameter nozzle, the inlet must be made of smaller diameter than the diameter of said larger nozzle, which in turn severely limits the area available for viewing of the interior of the tank at the time the appropriate nozzle is disposed in the inlet for dispensing unloaded gasoline.

OBJECT OF THE INVENTION

The object of this invention is to obviate the disadvantage in known constructions of fuel inlets, and to provide a fuel inlet which, in addition to rejecting the larger nozzle employed for dispensing leaded gasoline, will provide an adequate area for the viewing of the interior of the tank at the time a nozzle for dispensing unleaded gasoline is inserted into the fuel inlet.

INVENTIVE CONCEPT

According to the present invention, the fuel inlet is tubular and has a cross sectional area considerably in excess of the diameter of a nozzle employed for dispensing unleaded gasoline, and a baffle plate is rigidly secured within the fuel inlet in transverse relationship therewith, the baffle plate having an opening sized to receive only a nozzle employed for dispensing unleaded gasoline, and having apertures located laterally of said opening to permit viewing of the tank interior at the time an appropriate fuel nozzle is positioned within said opening.

DESCRIPTION OF THE DRAWINGS

The invention will now be described with reference to the accompanying drawings, in which.

DESCRIPTION OF THE PREFERRED EMBODIMENTS

Figure 1:
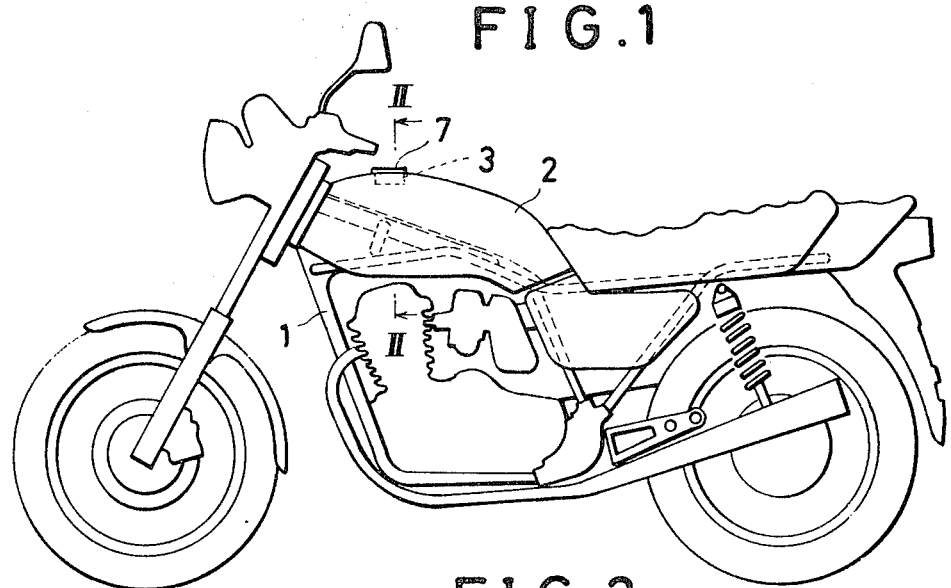
FIG. 1 is a side elevational view of a motorcycle employing a fuel inlet according to the present invention.
Figure 2:
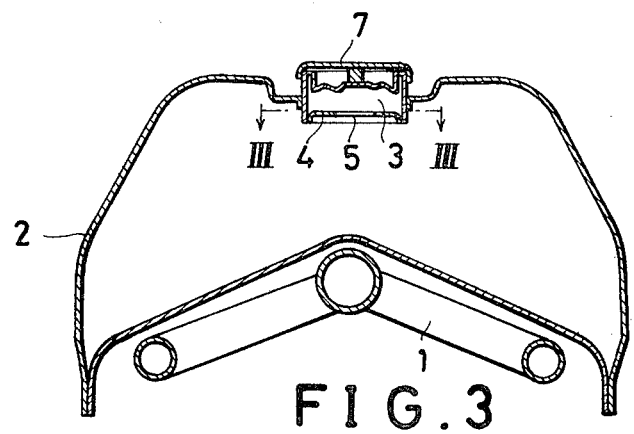
FIG. 2 is a cross section taken on the line II—II of FIG. 1.
Figure 3:
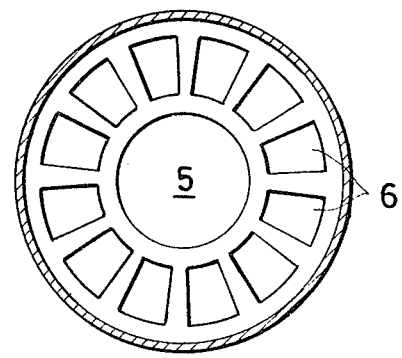
FIG. 3 is a cross section taken on the line III—III of FIG. 2.

Referring now to FIGS. 1, 2, 3, there is illustrated a motorcycle having a frame 1 on which is mounted a saddle form gasoline tank 2 having a fuel inlet 3 located in a top wall thereof, the fuel inlet 3 being rigidly secured in the wall of the tank 2 and supported thereby.

The fuel inlet 3 is of tubular form in cross-section, and, at or adjacent its lower end rigidly supports a baffle plate 4, which is attached to the fuel inlet 3 in any convenient manner, such as by spot welding, tack welding, soldering or the like.

The baffle plate 4 includes a central opening 5 and a plurality of apertures 6 of segmental form symmetrically encircling the central opening 5, and which are defined by radial spokes of the baffle plate which extend between an annular inner portion defining the opening 5 and an outer annular portion which is secured to the fuel inlet 3.

The opening 5 is demensioned for it to permit the passage therethrough of a fuel nozzle of the type employed for dispensing unleaded gasoline, and is insufficiently large in diameter for it to accommodate a fuel nozzle used for dispensing other forms of gasoline, in particular, unleaded gasoline. Any attempt to insert the said larger diameter nozzle into the tank will be prevented by the baffle plate 4. Further, if an intentional attempt should be made to fill the tank with leaded gasoline, the spokes of the baffle plate will cause splash back of the gasoline, thus giving an immediate warning that an attempt is being made to fill the tank with an improper fuel.

Upon the insertion of a nozzle employed for dispensing unleaded gasoline through the aperture and into the tank, the baffle plate 4 then serves to support the nozzle centrally within the fuel inlet and spaced from the walls thereof, the apertures 6 permitting ready viewing of the interior of the tank to determine the extent to which the tank has been filled, and, of any imminent danger of overfilling the tank.

The fuel inlet is closed in a conventional manner by a filler cap 7, the fuel inlet 3 and the filler cap 7 being provided with cooperating interlocking cam surfaces for securing the filler cap 7 in position.

Figure 4:
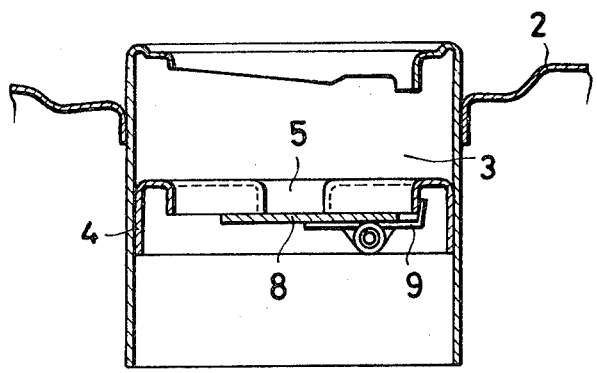
FIG. 4 is a sectional side elevation of an alternative form of fuel inlet according to the present invention.
Figure 5:
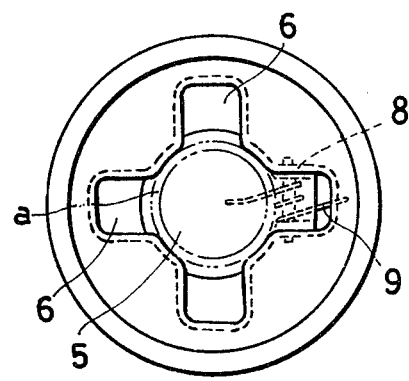
FIG. 5 is a plan view of FIG. 4.

Referring now to the modified embodiment of FIGS. 4 and 5, the baffle plate 4 is mounted within the fuel inlet 3 at a position intermediate the ends of the fuel inlet 3, the baffle plate having a central opening 5 of generally cruciform shape to define apertures 6 which extend laterally of the central opening 5. Conveniently, the baffle plate 4 is formed as a metal stamping for it to have axially extending flanges at its outer periphery and extending peripherally of the central opening 5 and the associated apertures 6.

In order to prevent either intentional or unintentional filling of the tank with a gasoline of a type other than unleaded gasoline, a movable shutter 8 is pivotally supported by the baffle plate 4, and is biased by a spring 9 into a position in which it extends across the central opening 5 and partially obstructs the apertures 6. Upon the insertion into the aperture 5 of a nozzle of the type used for dispensing unleaded gasoline, the shutter 8 is rotated about its pivotal support against the bias of the spring 9 to a position in which it no longer obstructs the insertion of the nozzle into the fuel tank, viewing of the level of the fuel within the tank being readily permitted through the apertures 6.

Any attempt to insert into the tank a nozzle of the type employed for dispensing leaded gasoline is prevented by virtue of the opening 5 being of a diameter less than that of the nozzle employed. If any attempt is made to subvert the purpose of the baffle plate 4 by filling the tank from a position above the baffle plate, such an attempt is prevented by the shutter 5 which will prevent the direct flow of gasoline into the tank, the relatively smaller cross sectional area of the apertures 6 being insufficient to carry the flow of gasoline from the nozzle, thus causing blow-back of the gasoline.

Figure 7:
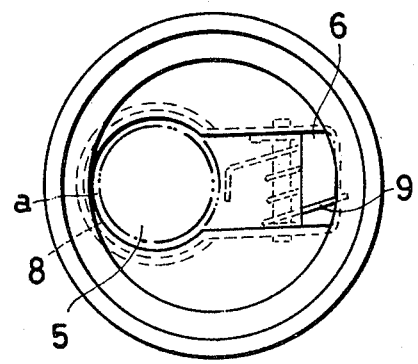
FIG. 7 is a plan view of the fuel inlet of FIG. 6.
Figure 9:
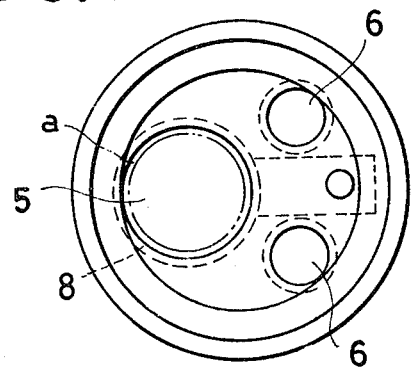
FIG. 9 is a plan view of the fuel inlet of FIG. 8.

In FIGS. 5 and 7, and also in FIG. 9, the reference a indicates in chain dotted lines the inner and outer diameters of a fuel nozzle of the correct size used for dispensing unleaded gasoline.

Figure 6:
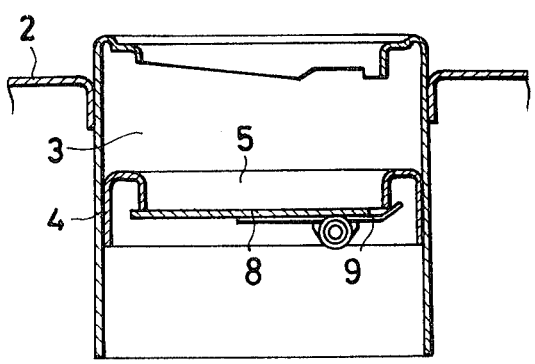
FIG. 6 is a sectional elevation of another alternative form of fuel inlet according to the present invention.

Referring now to the alternative embodiment disclosed in FIGS. 6 and 7, the aperture 5 is located adjacent the side wall of the baffle plate 4 and connects with a single aperture 6 extending substantially diametrically of the baffle plate 4. As in FIGS. 4 and 5, a movable shutter 8 is provided which is pivotally supported from the baffle plate 4, and which is resiliently biased into a position in which it closes the aperture 5 by means of a spring 9. Upon pivoting movement of the shutter, an increased area of the aperture 6 is provided for viewing of the level of fuel within the tank. As discussed above, in its position shown in the drawings, the shutter 8 prevents filling of the tank from a nozzle other than the type employed for dispensing unleaded gasoline.

Figure 8:
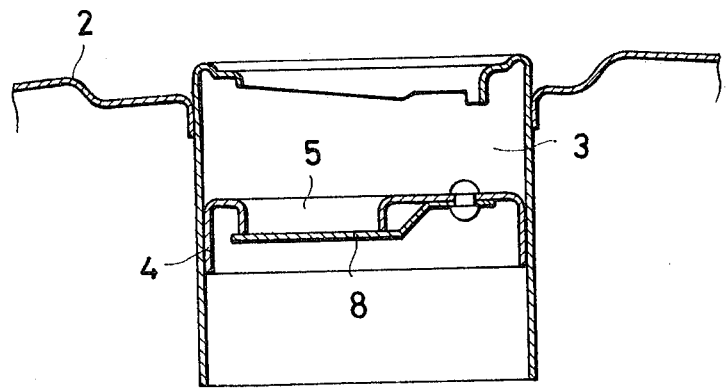
FIG. 8 is a sectional side elevation of still another form of fuel inlet according to the present invention.

In FIGS. 8 and 9, the opening 5 again is positioned adjacent the side wall of the baffle plate 4, and the baffle plate 4 includes two openings 6 at spaced positions circumferentially thereof, through which the interior of the tank can be viewed. In FIGS. 8 and 9, a shutter 8 is provided which is formed from spring steel or any other suitable spring-like material, the shutter 8 being secured to the baffle 4 in any convenient manner, such as by a rivet. As in the other embodiments, the opening 5 prevents the insertion into the fuel tank of a fuel nozzle other than that employed for dispensing unleaded gasoline, the shutter 8, when in its position shown in the drawings, subverting any attempt to fill the tank from a position above the baffle 4.

Figure 10:
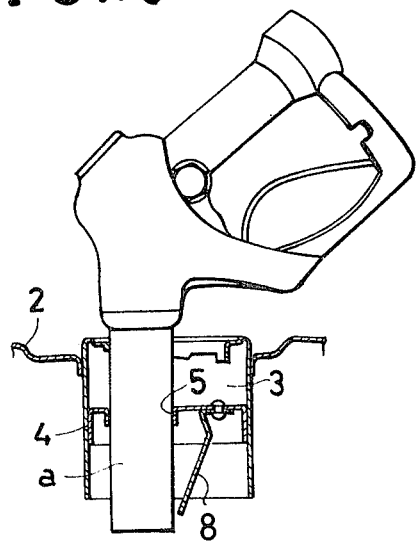
FIG. 10 is a diagrammatic view illustrating the insertion of an appropriate fuel nozzle into the fuel inlet of FIGS. 8 and 9.

In each of FIGS. 4 through 9, and also in FIG. 10, the baffle 4 is shown as including a downwardly extending axial flange which surrounds the opening 5. Upon the insertion of an appropriate fuel nozzle into the opening 5, the downwardly extending flange cooperates with the nozzle to support it in a vertically oriented position without intervention on the part of the operator.

It will be understood that various modifications may be made of the structures discussed above without departing from the inventive concept as defined in the appended claims.

What we claim is:

1. A fuel inlet for a fuel tank, said fuel tank comprising a saddle form tank having an middle upwardly concave bottom portion, said inlet comprising:
   a tubular member extending through an upper wall of said tank centrally thereof and rigidly supported thereby; and
   a baffle plate located within said tubular member and extending transversely thereof, the baffle plate having an opening sized to accept a fuel nozzle of a determined diameter and reject a fuel nozzle of a diameter larger than said determined diameter, and having a plurality of apertures located laterally of and symmetrically surrounding said opening permitting viewing of the tank interior, said apertures being insufficient in cross-sectional area to accommodate the passage therethrough of a conventional fuel nozzle.

2. The fuel inlet according to claim 1, in which said baffle plate includes axially extending portions surrounding said opening and which provide a support for a fuel nozzle when said nozzle is inserted into said fuel inlet.

3. The fuel inlet according to claim 2, in which said axially extending portions are comprised by an axially extending flange surrounding said opening.

4. The fuel inlet according to claim 1, including a movable shutter which is displaceable by a fuel nozzle when inserted into said opening, means supporting said shutter for pivoting movement, and means resiliently biasing said shutter to a position in which it extends across said opening.

* * * * *